United States Patent
Rybnikov

Patent Number: 5,353,321
Date of Patent: Oct. 4, 1994

[54] PLASMA THERMOELEMENT

[76] Inventor: Aleksandr Rybnikov, 79-06 35th Ave., #5K, Jackson Heights, N.Y. 11372

[21] Appl. No.: 79,505

[22] Filed: Jun. 21, 1993

[51] Int. Cl.$^5$ .............................................. G21D 7/00
[52] U.S. Cl. .................................. 376/320; 376/321; 376/126
[58] Field of Search ............... 376/320, 321, 126, 411, 376/416, 425; 250/396

[56] References Cited

U.S. PATENT DOCUMENTS

| | | | |
|---|---|---|---|
| 2,745,973 | 5/1956 | Rappaport | 376/320 |
| 2,748,339 | 5/1956 | Rudenberg | 376/320 |
| 3,211,586 | 10/1965 | McCoy et al. | 376/320 |
| 3,214,295 | 10/1965 | Danko et al. | 376/320 |
| 3,793,144 | 2/1974 | Magladry | 376/421 |
| 3,935,064 | 1/1976 | Yellowless | 176/73 |
| 4,008,407 | 2/1977 | Fletcher et al. | 310/4 R |
| 4,010,534 | 3/1977 | Anthony et al. | 29/572 |
| 4,024,420 | 5/1977 | Anthony et al. | 310/3 B |
| 4,040,903 | 8/1977 | Monroe, Jr. | 376/321 |
| 4,163,689 | 5/1979 | Grossman et al. | 176/68 |
| 4,810,879 | 3/1989 | Walker | 250/305 |

*Primary Examiner*—Donald P. Walsh
*Assistant Examiner*—Meena Chelliah

[57] ABSTRACT

A plasma thermoelement which is built into the immediate volume of a nuclear fuel mass of a nuclear fuel element is described which comprises a snorkel (12) which is surrounded by a nuclear fuel mass (14) which in turn is surrounded by a cladding (16). Both the exit end of the snorkel and the cladding are connected electrically only via an external load. The nuclear fuel mass is formed from a multitude of the ceramic nuclear fuel microspheres (24). The use of plasma as high-temperature conductor of thermoelement permits to increase conversion efficiency and decrease mass of conversion system.

8 Claims, 2 Drawing Sheets

PLASMA THERMOELEMENT

BACKGROUND-FIELD OF INVENTION

This invention relates to energy conversion systems, specifically to high-temperature thermoelements.

BACKGROUND-DESCRIPTION OF PRIOR ART

High-temperature conversion systems are used in space nuclear reactor plants. Thermoelements are well developed, but they are heavy, have relatively low operating temperatures and of low efficiencies. This is because of lack of the proper material for conductor working at high temperature and withstanding the great temperature gradient across the thermoelement.

There is no problem for plasma. Furthermore, it is well known that figure of merit of plasma is the most in principle. Nevertheless, advantage is not taken of plasma in the conventional thermoelements as conductor.

There are nuclear fuel elements in which the nuclear fuel mass is formed from a multitude of fuel microspheres. The fuel microspheres are about the same size so that a intersphere space provides intercommunicative porosity of the nuclear fuel mass. Under the operating conditions plasma is developed into the intersphere space. Fission gases are ionized by thermal surface ionization and by collisions with fission fragments and fast electrons which emit when a fission fragment intersects the surface of fuel microsphere in any direction. At the same time there is the emission of electrons from the surface of fuel microspheres.

In some nuclear fuel elements the proper pressure into the volume of intercommunicative porosity of the nuclear fuel mass is maintained by sweeping out fission gases through a snorkel. The snorkel sits entirely in the central void of the fuel mass and is not in contact with a cladding of the nuclear fuel element.

OBJECTS AND ADVANTAGES

Accordingly, it is an object of the present invention to provide a plasma thermoelement using plasma as high-temperature conductor to increase the maximum conversion efficiency.

Another object of the present invention is to provide a plasma thermoelement which is built into the immediate volume of a nuclear fuel mass of a nuclear fuel element to increase the Carnot cycle thermal efficiency and decrease the mass of energy conversion system.

A further object of the present invention is to provide a plasma thermoelement for direct converting of thermal energy to A.C. electrical energy by using a pulsed reactor.

These and others objects and advantages of the present invention will be more apparent from the following description and appended drawings.

DRAWING FIGURES

Figure 1:
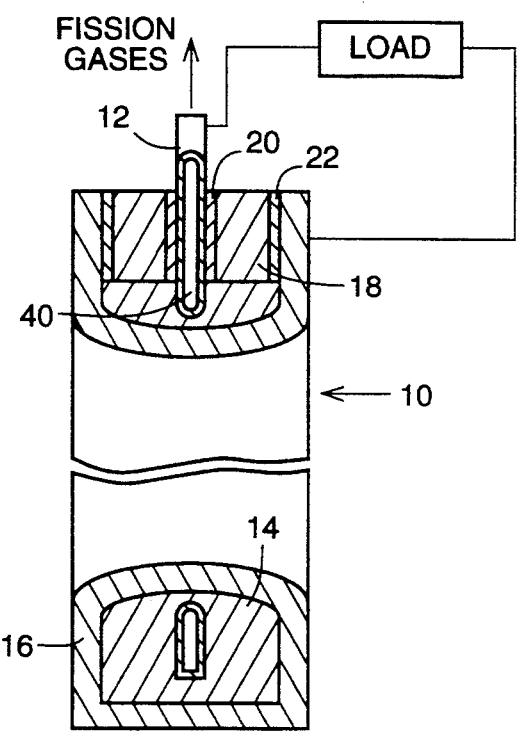
FIG. 1 shows a nuclear fuel element having a built-in plasma thermoelement.

| Reference Numerals In Drawing | |
|---|---|
| 10 nuclear fuel element | 12 snorkel |
| 14 nuclear fuel mass | 16 cladding |
| 18 insulating plug | 20 metallic fabric |
| 22 metallic fabric | 24 fuel microsphere |
| 26 intersphere space | 28 fuel compound microsphere |
| 30 depleted nuclear fuel center | |
| 32 high-enriched nuclear fuel layer | |
| 34 depleted nuclear fuel microsphere | |
| 36 fin-shaped conductor | 38 orifice |
| 40 void | 42 plasma channel |
| 44 nuclear fuel column | 46 hot zone |
| 48 cold zone | |

DESCRIPTION-FIGS. 1 TO 4

Referring now to FIGS. 1 to 4, nuclear fuel element having a built-in plasma thermoelement of the present invention is shown generally at 10 and includes a snorkel 12 which is surrounded by a nuclear fuel mass 14 which in turn is surrounded by a cladding 16. The nuclear fuel mass 14 has an intercommunicative porosity. In the embodiment shown in FIG. 1, the nuclear fuel element 10 is cylindrical in form and is provided with an insulating plug 18. The exit end of the snorkel 12 is fitted into the opening of the insulating plug 18. The clearances between the insulating plug 18 and both the snorkel 12 and the cladding 16 are packed with a pair of metallic fabrics 20 and 22, respectively. Both the exit end of the snorkel 12 and the cladding 16 are connected electrically only via an external load, represented in FIG. 1 by a rectangular box.

Figure 2A:
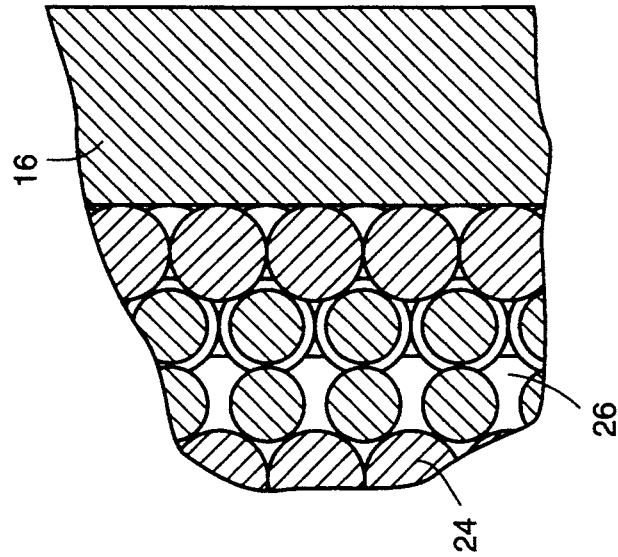
FIGS. 2A to 2C show cross sections of various embodiments of nuclear fuel mass under the assumption that microspheres are closely packed.
Figure 2B:
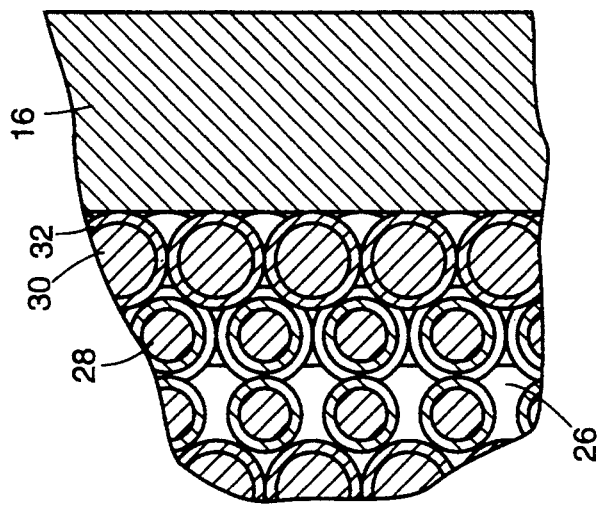
Figure 2C:
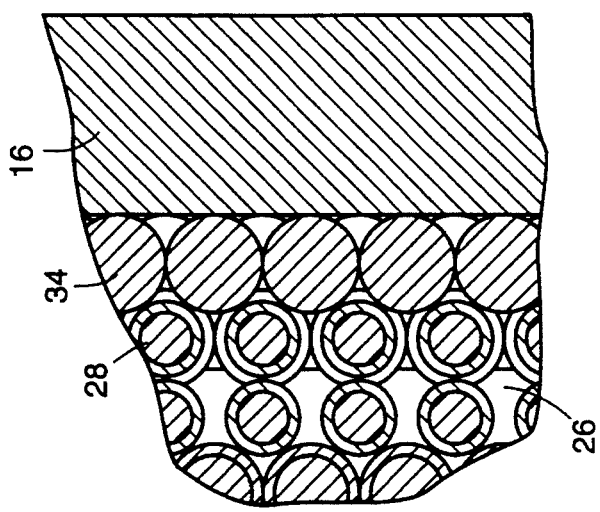

The embodiment of the nuclear fuel mass 14 with intercommunicative porosity is shown in FIG. 2A. The mass 14 is formed from a multitude of fuel microspheres 24. The fuel microspheres 24 are the same size so that a intersphere space 26 provides intercommunicative porosity of the mass 14. The fuel microspheres 24 are made from a ceramic nuclear fuel which is an insulator at ordinary temperatures. An additional embodiment of the mass 14 is shown in FIG. 2B. The mass 14 is formed from a multitude of fuel compound microspheres 28 which have a depleted nuclear fuel center 30 coated a high-enriched nuclear fuel layer 32. The thickness of the layer 32 is equal about the effective mean free path of fission fragments in the material of the layer 32. Both the depleted nuclear fuel center 30 and the high-enriched nuclear fuel layer 32 are made from the same ceramic nuclear fuel. Another embodiment of the mass 14 is shown in FIG. 2C. It differs from the above-mentioned embodiment in that the mass 14 includes at least one layer of the depleted nuclear fuel microspheres 34 positioned between cladding 16 and multitude of fuel compound microspheres 28.

Figure 3:
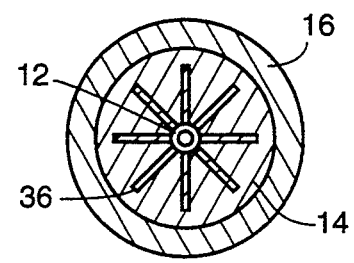
FIG. 3 shows a cross section a nuclear fuel element with a snorkel having a plurality of fin-shaped conductors.
Figure 4:
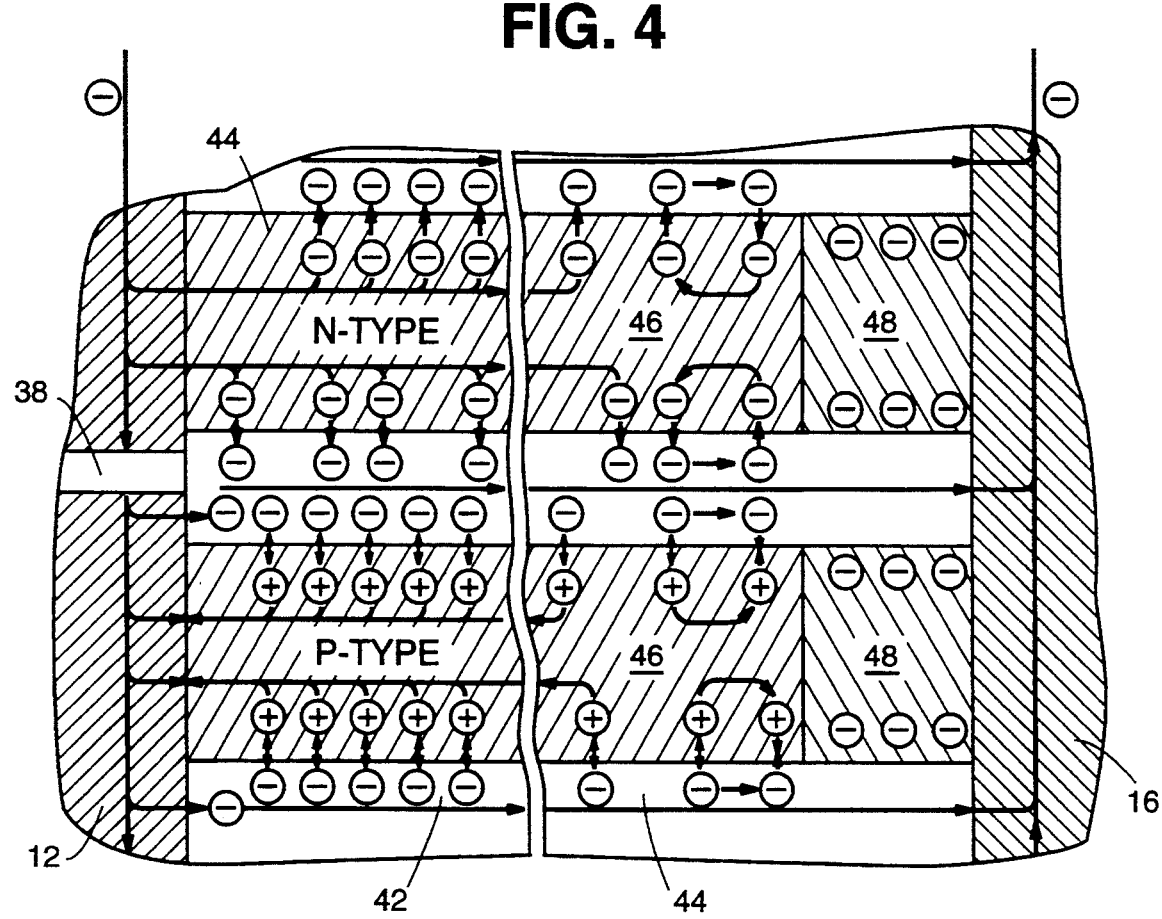
FIG. 4 shows a schematic sketch of movement of electrons in the interior of nuclear fuel mass.

An additional embodiment of the snorkel 12 are shown in FIG. 3. The part of the snorkel 12 surrounded by the mass 14 has a plurality of fin-shaped conductors 36. The snorkel 12 and the fin-shaped conductors 36 are made from a high-melting material which is compatible with a ceramic nuclear fuel. The center section of the wall of the snorkel 12 contains a plurality of orifices 38 which are shown in FIG. 4. The diameter of orifices 38 is less by half than the diameter of any fuel microspheres but is not less about 0.005-cm. The orifices 38 connect a void 40 of the snorkel 12 with the volume of intercommunicative porosity of the mass 14.

Operation-FIGS. 1 to 4

Shortly after start-up of reactor with the nuclear fuel elements 10 having a built-in plasma thermoelement of the present invention, a plasma is developed into the intersphere space 26. The plasma is offset by Debye screening length from the surfaces of the fuel microspheres 24 or the fuel compound microspheres 28. Owing to this, the operating structure of the nuclear fuel mass 14 with intercommunicative porosity may be represented schematically in FIG. 4 in the following manner. The intersphere space 26 can be treated as a set of plasma channels 42. The fuel microspheres 24 or the fuel compound microspheres 28 can be treated as a set of nuclear fuel columns 44. The nuclear fuel columns 44 each have a hot zone 46 and a cold zone 48. The cold zone 48 includes the layer of the depleted nuclear fuel microspheres 34. The temperature throughout the hot zone 46 is that which simultaneously offers the prospect of both the emission of electrons from the surface of the hot zone 46 and the conductivity of the hot zone 46. The part of the cold zone 48 retains insulating. The temperatures of snorkel 12 and the fin-shaped conductors 36 also offer the prospect of the emission of electrons.

Thus, the set of plasma channels 42 connects the cladding 16 to the snorkel 12, the fin-shaped conductors 36, and the hot zone 46 of the nuclear fuel columns 44. The ends of plasma channels 42 have the unequal temperatures. In consequence of thermoelectromotive force the current flows along the circuit which includes the set of plasma channels 42, the fin-shaped conductors 36, the hot zone 46 of the nuclear fuel columns 44, the snorkel 12, the external load, and the cladding 16.

The current flowed along the hot zone 46 of the set of nuclear fuel columns 44 is significant because the emission of electrons exceeds the emission of radiation at the operating temperatures. The value of current depends also on whether the conductivity of the nuclear fuel columns 44 is p-type or n-type. In the case that the hot zone 46 acquires the p-type conductivity under the running conditions, there is the thermoelectromotive force across it in addition to one of plasma channels 42. Thus, under the operating conditions the nuclear fuel mass 14 with intercommunicative porosity is made into a plasma thermoelement operated under temperatures up to 3,000 K.

The embodiment of the mass 14 in the form of multitude of microspheres decreases heat conduction of the mass 14. Owing to this, a heat removal is produced to a greater degree by electrons and to a lesser degree by radiation. As a result the temperature of the fuel is significantly non linear in the specific power of the nuclear fuel element under the operating conditions. On the one hand, this allows to obtain great value of specific power; on the other hand, the variation of the temperature with the specific power is few.

FIG. 4 shows a circulating back current alongside the main current. The circulating back current is associated with working of a electronic heat pipe. The electronic heat pipe operates on the same principle as a conventional heat pipe but the electronic heat pipe uses electrons as the working fluid. The electronic heat pipes exist in the fuel mass of the conventional nuclear fuel elements when there are the cracks into the nuclear fuel. If the electronic heat pipe develops in a crack then it prevents this crack from filling. The availability of the snorkel 12 cuts down the volume of the circulating back currents by the input of electrons. The enlargement of the surface of the snorkel 12 by adding to the snorkel 12 the plurality of fin-shaped conductors 34 causes an additional decrease of the volume of the circulating back currents.

As shown in FIG. 4, the surface of the cold zone 48 has a surface-bound charge caused by low conductivity of cold zone 48. Therefore, the current of electrons came out from the plasma channel 42 on the cold zone 48 is relatively small.

The harnessing of fission energy as the important contributor of ionization is maximized by applying the fuel compound microspheres 28. In this case almost a half of fission fragments can emit into plasma channels 42. An additional advantage of the harnessing of fission energy lies in the fact that ionization of this type is found at the periphery of the mass 14 where there is not thermal surface ionization. The ionization of the plasma channels 42 in the volume of cold zone 48 is produced in the main by fast electrons which emit when a fission fragment intersects the surface of the fuel microsphere 24 or the fuel compound microsphere 28 in any direction. This offer the prospect of inverting of the plasma thermoelement output to A.C. by using the pulsed reactor. In this case there is the effective ionization of the part of plasma channels 42 in the region of the cold zone 48 only during the course of neutron pulse. In consequence the electrons traverse the part of plasma channels 42 in the region of the cold zone 48 under these circumstances. Thereafter the current will decrease as the ionization drops after completing the neutron pulse. The further cut in current will be derived from increasing the surface-bound charge on the surface of the cold zone 48 because its conductivity depends on the internal ionization by fission fragments. The availability of the layer of the depleted nuclear fuel microspheres 34 enhances the action of these factors.

The fission gases and others vapors are escaped through the orifices 38 into the void 40 and then from the snorkel 12. The the entire orifice 38 is hotter than the fuel temperature due to next reason. The snorkel 12 is hotter than the surface of microspheres due to current heating. Therefore, the temperatures of the ends of orifice 38 are different. However, this temperature difference is few owing to the work of the electronic heat pipe developing in the orifice 38. Because the orifices 38 are at high temperature, they cannot plug with fuel. The small diameter of the orifices 38 allows the fission gas to vent, while limiting the loss of fuel vapor through the snorkel 12.

SUMMARY, RAMIFICATIONS, AND SCOPE

It is apparent from the above-described embodiments that plasma can be used as high-temperature conductor of thermoelement which can be built into the immediate volume of a nuclear fuel mass of a nuclear fuel element. In addition, when the plasma thermoelement is used in a pulsed reactor, it can direct convert thermal energy to A.C. electrical energy. Furthermore, the plasma thermoelement has the additional advantages in that it provides a maximum conversion efficiency because the figure of merit of plasma is the most in principle;

it provides the most Carnot cycle thermal efficiency when it is considered that the temperature of heat source may be as great as 3,000 K. and the temperature of the cladding may be below 1,000 K.;

it permits a reduction in the mass and size of energy conversion system in consequence of the zeroth mass of conductor of plasma thermoelement, the use of parts of the nuclear fuel elements as heat sources ant heat sinks, and also as a result an increase in all efficiencies.

It will be understood that each of the elements described above, or two or more together, may also find a useful application in other types of constructions differing from the types described above.

Without further analysis, the foregoing will so fully reveal the gist of the present invention that others can, by applying current knowledge, readily adapt it for various applications without omitting features that, from the standard point of prior art, fairly constitute essential characteristics of the generic or specific aspects of this invention.

While certain novel features of this invention have been described and are pointed out in the annexed claims, it is not intended to be limited to the details above, since it will be understood that various omissions, modifications, substitutions and changes in the forms and details of the invention and its operation can be made by those skilled in the art without departing in any way from the spirit of the present invention. For example, the nuclear fuel element with the plasma thermoelement inside can have other shapes, such as flat, circular, etc.

Thus the scope of the invention should be determined by the appended claims and their legal equivalence, rather than by the examples given.

I claim:

1. A plasma thermoelement which is built into the immediate volume of a nuclear fuel mass of a nuclear fuel element, comprising:
   (a) a snorkel,
   (b) a nuclear fuel mass having an intercommunicative porosity and surrounding the most part of said snorkel,
   (c) a cladding surrounding both said nuclear fuel mass and most of said snorkel and connected electrically with said snorkel only via external load,
   (d) an insulator insulating the exit end of said snorkel from said cladding.

2. A thermoelement as defined in claim 1, wherein said snorkel includes a plurality of fin-shaped conductors and the center section of the wall of said snorkel contains a plurality of orifices.

3. A thermoelement as defined in claim 2, wherein aid nuclear fuel mass with intercommunicative porosity is formed from a multitude of fuel microspheres.

4. A thermoelement as defined in claim 3, wherein said fuel microsphere consists of a depleted nuclear fuel center and a high-enriched nuclear fuel layer.

5. A thermoelement as defined in claim 4, wherein said nuclear fuel mass includes at least one layer of the depleted nuclear fuel microspheres, positioned between said cladding and said multitude of fuel compound microspheres.

6. A thermoelement as defined in claim 5, wherein said fuel microspheres are made from ceramic nuclear fuel which is an insulator at ordinary temperatures.

7. A thermoelement as defined in claim 6; further comprising a pair of metallic fabrics with an intercommunicative porosity for holding said insulator.

8. A method for using plasma as a high-temperature conductor of thermoelement, comprising the steps of:
   (a) fission-heating a nuclear fuel mass with an intercommunicative porosity to the temperature which simultaneously offers the prospect of both the conductivity of said nuclear fuel mass and the emission of electrons into the volume of said intercommunicative porosity; and
   (b) removing electrons from said plasma into a cladding of a nuclear fuel element and then supplying them to said nuclear fuel mass via an external load and a snorkel positioned into the volume of said nuclear fuel mass and insulated from said cladding.

* * * * *